(12) United States Patent
Wang

(10) Patent No.: US 9,072,155 B2
(45) Date of Patent: Jun. 30, 2015

(54) TRANSFORMER NETWORK

(71) Applicant: Moxtek, Inc., Orem, UT (US)

(72) Inventor: Dongbing Wang, Saratoga Springs, UT (US)

(73) Assignee: Moxtek, Inc., Orem, UT (US)

( * ) Notice: Subject to any disclaimer, the term of this patent is extended or adjusted under 35 U.S.C. 154(b) by 194 days.

(21) Appl. No.: 13/863,148

(22) Filed: Apr. 15, 2013

(65) Prior Publication Data

US 2014/0140485 A1 May 22, 2014

Related U.S. Application Data

(60) Provisional application No. 61/662,992, filed on Jun. 22, 2012.

(51) Int. Cl.
*H05G 1/10* (2006.01)
*H05G 1/12* (2006.01)
*H01F 27/38* (2006.01)
*H02M 7/5381* (2007.01)

(52) U.S. Cl.
CPC . *H05G 1/10* (2013.01); *H05G 1/12* (2013.01); *H02M 7/5381* (2013.01); *H01F 27/38* (2013.01)

(58) Field of Classification Search
CPC ......... H05G 1/10; H05G 1/12; H02M 7/5381; H01F 27/24; H01F 27/38
USPC ...................... 378/101, 102; 363/21.02, 21.03
See application file for complete search history.

(56) References Cited

U.S. PATENT DOCUMENTS

| | | | |
|---|---|---|---|
| 6,072,856 A * | 6/2000 | Van Der Broeck et al. .. | 378/101 |
| 6,236,579 B1 * | 5/2001 | Watanabe et al. ............... | 363/25 |
| 6,297,976 B1 * | 10/2001 | Isono ............................... | 363/65 |
| 6,317,347 B1 * | 11/2001 | Weng ............................ | 363/134 |
| 6,906,930 B2 * | 6/2005 | Jang et al. ........................ | 363/17 |
| 7,054,411 B2 * | 5/2006 | Katcha et al. .................. | 378/101 |
| 7,218,059 B2 * | 5/2007 | Li et al. ...................... | 315/209 R |
| 7,400,708 B2 * | 7/2008 | Takahashi et al. ............ | 378/109 |
| 7,808,803 B2 * | 10/2010 | Xiong et al. ................... | 363/134 |
| 8,279,633 B2 * | 10/2012 | Ye et al. ...................... | 363/21.02 |
| 8,385,504 B2 * | 2/2013 | Hattrup et al. ................ | 378/101 |
| 8,395,912 B2 * | 3/2013 | Usui ........................... | 363/21.02 |
| 2010/0328968 A1 * | 12/2010 | Adragna et al. ............. | 363/21.02 |
| 2011/0069514 A1 * | 3/2011 | Chiba .......................... | 363/21.02 |
| 2013/0223109 A1 * | 8/2013 | Wang .............................. | 363/24 |

* cited by examiner

*Primary Examiner* — Allen C. Ho
(74) *Attorney, Agent, or Firm* — Thorpe North & Western LLP

(57) ABSTRACT

A transformer network circuit utilizing multiple smaller transformer cores, instead of a single, relatively larger core, for transferring electrical power while maintaining a smaller overall core mass.

20 Claims, 4 Drawing Sheets

TRANSFORMER NETWORK

CLAIM OF PRIORITY

Priority is claimed to U.S. Provisional patent application Ser. No. 61/662,992, filed on Jun. 22, 2012; which is hereby incorporated herein by reference in its entirety.

FIELD OF THE INVENTION

The present application is related generally to small-size step-up transformers.

BACKGROUND

Transformers can be used to step up, or step down, a voltage or a current, from primary windings to secondary windings. A core of the transformer can saturate, based on the amplitude of the electrical current through the windings, time of electrical current flow, and number of turns. Saturation of the core can result in reduced impedance of primary windings and a resulting increase in electrical current through the primary windings. This increased electrical current can result in undesirable heat generation and damage to components. A larger core may be used to avoid core saturation. In some applications, use of a larger core is undesirable, such as if small overall size is preferred, or due to a high cost of a larger core.

SUMMARY

It has been recognized that it would be advantageous to avoid transformer core saturation while minimizing transformer size increase. The present invention is directed to a transformer network that satisfies these needs. The apparatus comprises an LC switching circuit including a center connection, a top connection, and a bottom connection; primary windings comprising top primary windings and bottom primary windings; and secondary windings having a first end and a second end.

The center connection of the LC switching circuit can be electrically connected to a first end of the top primary windings and to a first end of the bottom primary windings. The top primary windings can be wrapped in a first direction around a first transformer core. The bottom primary windings can be wrapped in a second direction around the first transformer core. The first direction is opposite to the second direction.

The top primary windings can be wrapped in the first direction around at least one additional transformer core then a second end of the top primary windings can be electrically connected to the top connection of the LC switching circuit. The bottom primary windings can be wrapped in the second direction around the additional transformer core(s), then a second end of the bottom primary windings can be electrically connected to the bottom connection of the LC switching circuit.

The secondary windings can be wrapped around at least one of the transformer cores. The first end and the second end of the secondary windings can be configured to be electrically connected across a load.

Use of multiple cores, instead of a single larger core, can allow a relatively larger amount of electrical power transfer from primary to secondary windings without core saturation. The multiple cores can have a smaller overall mass or volume than a single core designed for the same power transfer.

DEFINITIONS

As used herein, terms related to direction of windings, such as "the top primary windings wrapped in a first direction" or "the bottom primary windings wrapped in a second direction" refers to a direction of winding wraps in a direction of electrical current flow around a core of a transformer. The winding direction relates to a direction of the magnetic field that will be produced by electrical current through the windings. Thus, if electrical current through windings wrapped in the first direction creates a magnetic field in one direction in the core (up for example), then electrical current through windings wrapped in the second direction can create a magnetic field in an opposite direction in the core (down for example).

DETAILED DESCRIPTION

Figure 1:
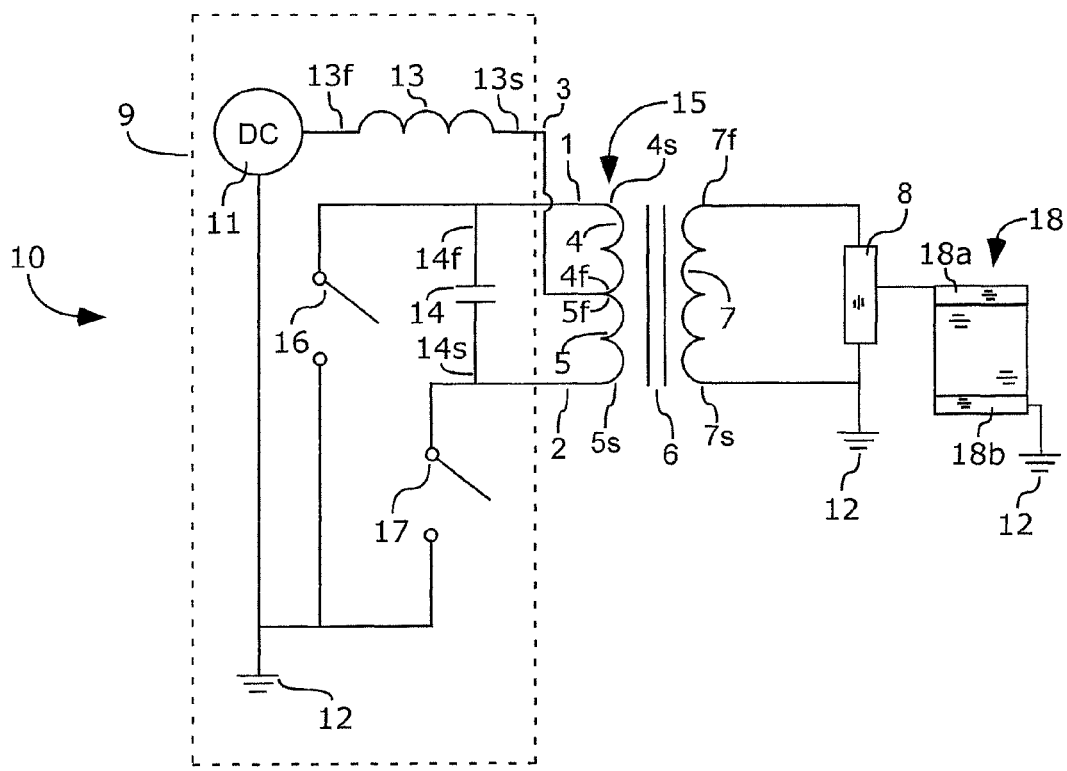
FIG. 1 is a schematic of a transformer network, in accordance with an embodiment of the present invention.

As illustrated in FIG. 1, a transformer network 10 is shown comprising an LC switching circuit 9 including a center connection 3, a top connection 1, and a bottom connection 2; primary windings 15 comprising top primary windings 4 and bottom primary windings 5; and secondary windings 7 having a first end 7f and a 7s second end. The center connection 3 can be electrically connected to a first end 4f of the top primary windings 4 and to a first end 5f of the bottom primary windings 5. The top connection 1 of the LC switching circuit 9 can be electrically connected to a second end 4s of the top primary windings 4. The bottom connection 2 of the LC switching circuit 9 can be electrically connected to a second end 5s of the bottom primary windings 5. The primary windings 15 and the secondary windings 7 can be wrapped around a transformer core 6.

Figure 2:
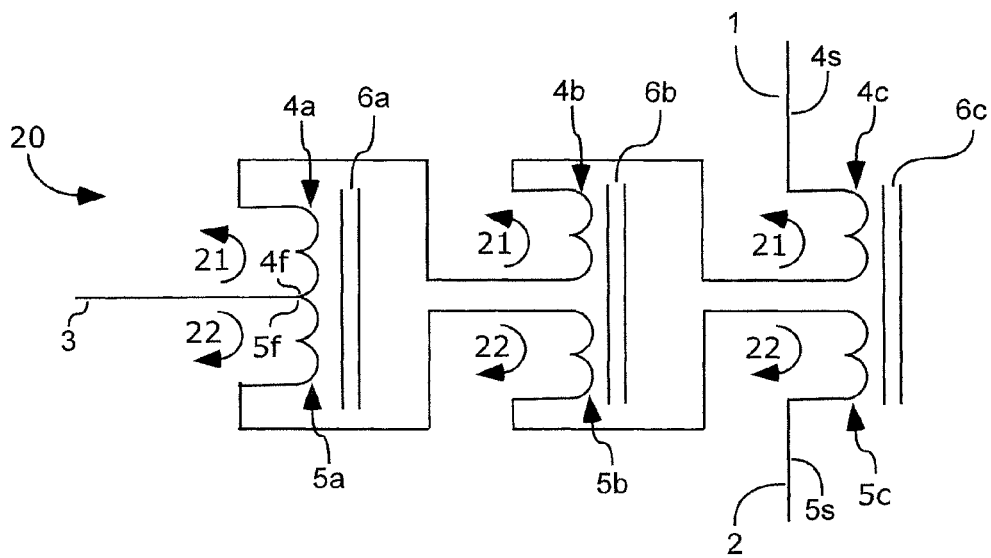
FIG. 2 is a schematic of primary windings and transformer cores of a transformer network, in accordance with an embodiment of the present invention.

As shown on the schematic 20 of top primary windings sections 4a-4c and transformer cores 6a-6c in FIG. 2, the top primary windings section 4a can be wrapped in a first direction 21 around a first transformer core 6a. The bottom primary windings section 5a can be wrapped in a second direction 22 around the first transformer core 6a.

The first direction 21 can be opposite to the second direction 22. The top primary windings sections 4b-4c can be wrapped in the first direction 21 around at least one additional transformer cores 6b-6c, then the second end 4s of the top primary windings 4 can be electrically connected to the top connection 1 of the LC switching circuit 9 (FIG. 1). The bottom primary windings 5b-5c can be wrapped in the second direction 22 around the additional transformer core(s) 6b-6c, then the second end 5s of the bottom primary windings 5 can be electrically connected to the bottom connection 2 of the LC switching circuit 9. The secondary windings 7 can be wrapped around at least one of the transformer core(s) 6a-6c.

Use of multiple transformer cores, instead of a single larger transformer core, can allow a relatively larger amount of electrical power transfer from primary to secondary windings without core saturation. The multiple transformer cores can have a smaller overall mass or volume than a single core designed for the same power transfer, which can result in a lower overall power supply size, weight, and cost.

The transformer networks described herein can especially be useful for step up transformers in which there is a relatively large voltage difference between primary and secondary windings. A turn ratio of the primary windings 15 to secondary windings 7 on one, some, or all of the transformer cores 6 can be greater than 1:10 in one embodiment or greater than 1:100 in anther embodiment. For example, in the circuit 60 of FIG. 6, $N_{15a}:N_{7a}>1:10$, $N_{15b}:N_{7b}>1:10$, $N_{15c}:N_{7c}>1:10$, and/or $N_{15d}:N_{7d}>1:10$. Alternatively, in the circuit 60 of FIG. 6, $N_{15a}:N_{7a}>1:100$, $N_{15b}:N_{7b}>1:100$, $N_{15c}:N_{7c}>1:100$, and/or $N_{15d}:N_{7d}>1:100$. A peak voltage of the secondary windings 7 can be at least 100 volts higher than a peak voltage of the primary windings 15 in one embodiment, or at least 1000 volts higher in another embodiment.

As shown in FIG. 1, secondary windings 7 of the transformer network 10 can have a first end 7f and a second end 7s. The first end 7f and a second end 7s can be configured to be electrically connected across a load. The first end 7f and a second end 7s can be electrically connected to the load 8. In one embodiment, the load 8 can be a high voltage multiplier circuit, such as a Cockcroft-Walton multiplier for example. The high voltage multiplier circuit can provide at least 1000 volts between an anode 18b and a cathode 18a of an x-ray tube 18.

The LC switching circuit 9 of FIG. 1 can comprise a direct current source 11, an inductor 13, a capacitor 14, a first electronic switch 16, a second electronic switch 17, a center connection 3, a top connection 1, and a bottom connection 2. The direct current source 11 can be electrically connected to a common connection 12 at one end and to a first connection 13f of an inductor 13 at an opposing end. A second connection 13s of the inductor 13 can be electrically connected to the center connection 3. A capacitor 14 can have a first end 14f electrically connected to the top connection 1, and at an opposing end, a second end 14s electrically connected to the bottom connection 2. The capacitor 14 can be electrically connected in parallel with the primary windings 15. The first electronic switch 16 can be electrically connected to the common connection 12 at one end and to the top connection 1 at an opposing end. The second electronic switch 17 can be electrically connected to the common connection 12 at one end and to the bottom connection 2 at an opposing end.

For normal operation of the LC switching circuit 9, the first electronic switch 16 is closed and the second electronic switch 17 is open, thus allowing electrical current to flow from the direct current source 11 through the top primary windings 4 to ground or the common connection 12. The first electronic switch 16 can then open and the second electronic switch 17 can close, thus allowing electrical current to flow from the direct current source 11 through the bottom primary windings 5 to the common connection 12. This process can then be continually repeated. Allowing electrical current to alternately flow through the top primary windings 4 then through the bottom primary windings 5 (which is wound in an opposite direction) can result in a changing magnetic field of the transformer cores 6a-6c. This changing magnetic field can induce an alternating current in the secondary windings 7. The inductor 13 can impede the change in quantity of direction of electrical current flow, thus smoothing out the changes in electrical current which can result in a sine wave electrical current output in the secondary winding 7.

As shown in FIGS. 3a-d, the secondary windings 7 can be wrapped in series. As shown on circuit 30a of FIG. 3a, an end 7d of a secondary winding 7a on one core 6a can be a connected to a beginning 7e of a secondary winding 7b on another core 6b. Wrapping the secondary windings 7 in series can be beneficial for having the same electrical current through each section of secondary windings 7 and for allowing addition of voltage across the multiple secondary windings sections 7a-7c. Thus total voltage $V_T$ between the first end 7f of the secondary windings 7 and the second end 7s of the secondary windings 7 can be: $V_T = V1 + V2 + V3$.

Figure 4:
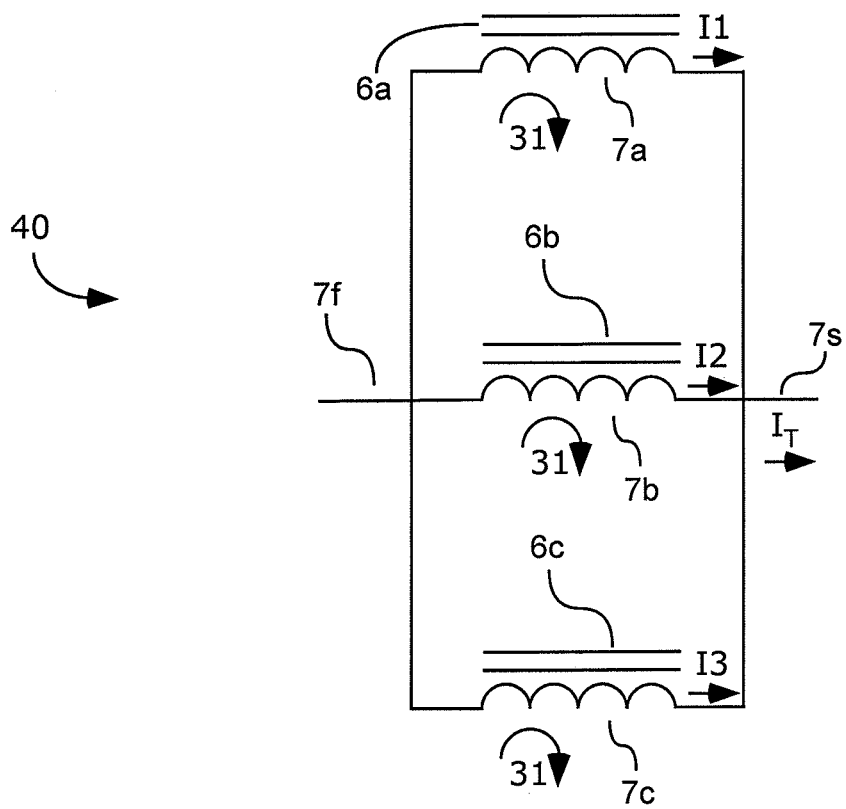
FIG. 4 is a schematic of transformer cores and secondary windings in parallel on a transformer network, in accordance with an embodiment of the present invention.

As shown on circuit 40 in FIG. 4, the secondary windings sections 7a-7c can be wrapped in parallel with the transformer cores 6a-6c. Thus, the first end 7f of the secondary windings 7 can be a starting connection for all secondary windings sections 7a-7c, and the second end 7s of the secondary windings 7 can be a terminal point for all secondary windings sections 7a-7c. Wrapping the secondary windings sections 7a-7c in parallel can be beneficial for having the same voltage across each section of secondary windings 7, but electrical current will be summed ($I_T = I1 + I2 + I3$). If secondary windings sections 7a-7c are wrapped in parallel, typically the same number of turns N of secondary windings sections 7a-7c would be used on each core 6a-6c. An alternative to having all secondary windings sections 7a-7c in parallel, or all in series, would be a combination of series and parallel.

For all transformer cores 6a-6c that have secondary windings sections 7a-7c, the secondary windings sections 7a-7c can all be wrapped in a single direction 31. The single direction 31 of wrapping the secondary windings 7 can be the same as the first direction 21 or the second direction 22.

Figure 3A:
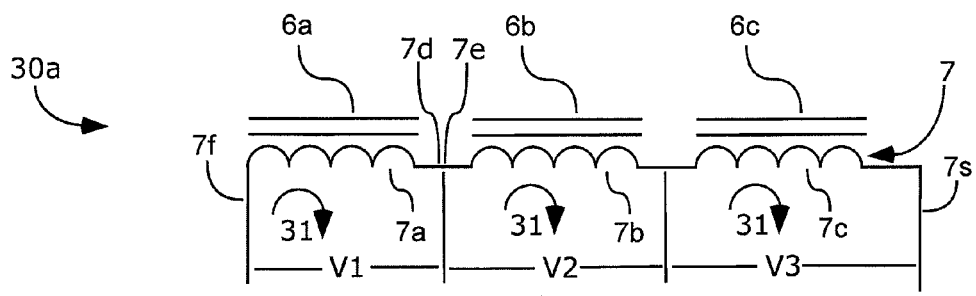
FIGS. 3a-d are schematics of transformer cores and secondary windings in series on a transformer network, in accordance with an embodiment of the present invention.
Figure 3B:
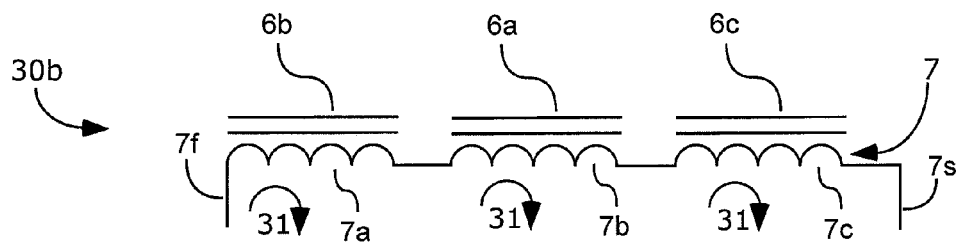
Figure 3C:
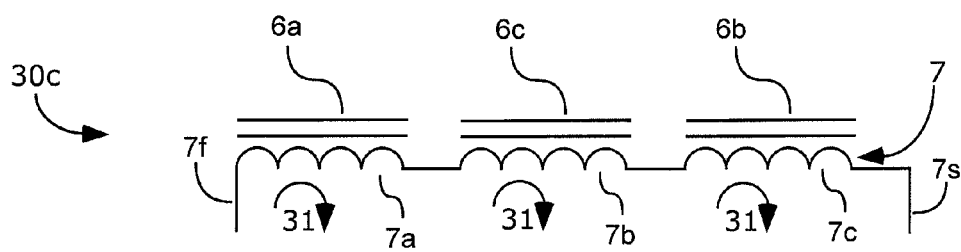
Figure 3D:
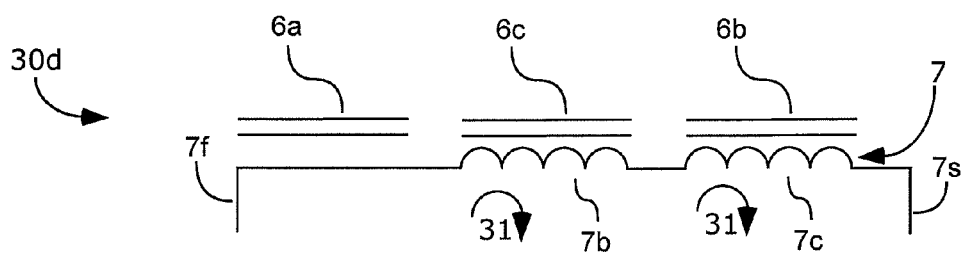

As shown in FIGS. 3a-3c, the secondary windings sections 7a-7c can be wrapped around the transformer cores 6a-6c in any order. For example, on circuit 30a in FIG. 3a, secondary windings sections 7a-7c wrap transformer core 6a first, transformer core 6b second, and transformer core 6c third. On circuit 30b in FIG. 3b, secondary windings sections 7a-7c wrap transformer core 6b first, transformer core 6a second, and transformer core 6c third. On circuit 30c in FIG. 3c, secondary windings sections 7a-7c wrap transformer core 6a first, transformer core 6c second, and transformer core 6b third.

Figure 5:
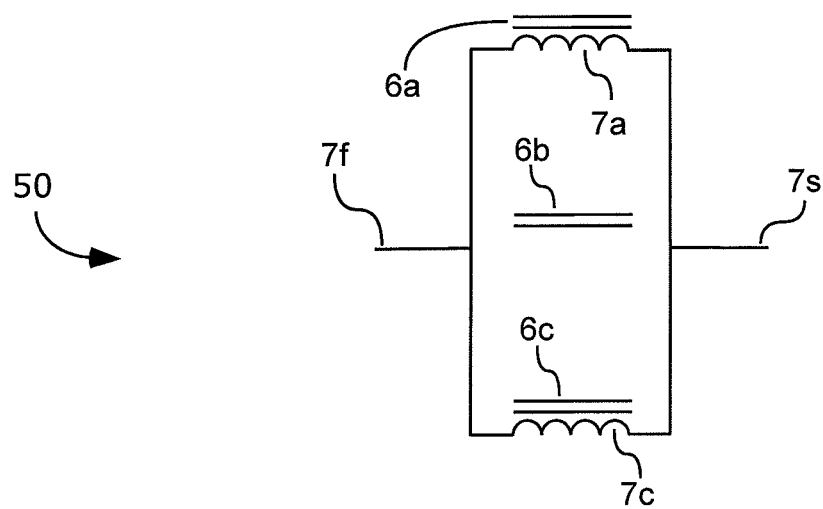
FIG. 5 is a schematic of transformer cores and secondary windings in parallel on a transformer network, in accordance with an embodiment of the present invention.

The secondary windings sections 7a-7c need not be wrapped on all transformer cores 6a-6c. For example, as shown on circuit 30d of FIG. 3d, the secondary windings section 7b and 7c can be wrapped around additional cores 6c and 6b, but not around the first transformer core 6a. Alternatively, but not shown, the secondary windings sections 7b and 7c can be wrapped around only one of the additional cores 6c and 6b, and/or the first transformer core 6a. It can be beneficial to leave at least one core unwrapped by secondary windings 7 in order to allow at least one core to avoid saturation during periods of high electrical current, and thus maintain a higher impedance in the primary windings. Wrapping the secondary windings 7 on only some of the cores is shown on the series configuration in FIG. 3d, but this also applies to the parallel configuration, as shown on circuit 50 in FIG. 5, wherein one of the additional transformer cores 6b is free of secondary windings 7.

Figure 6:
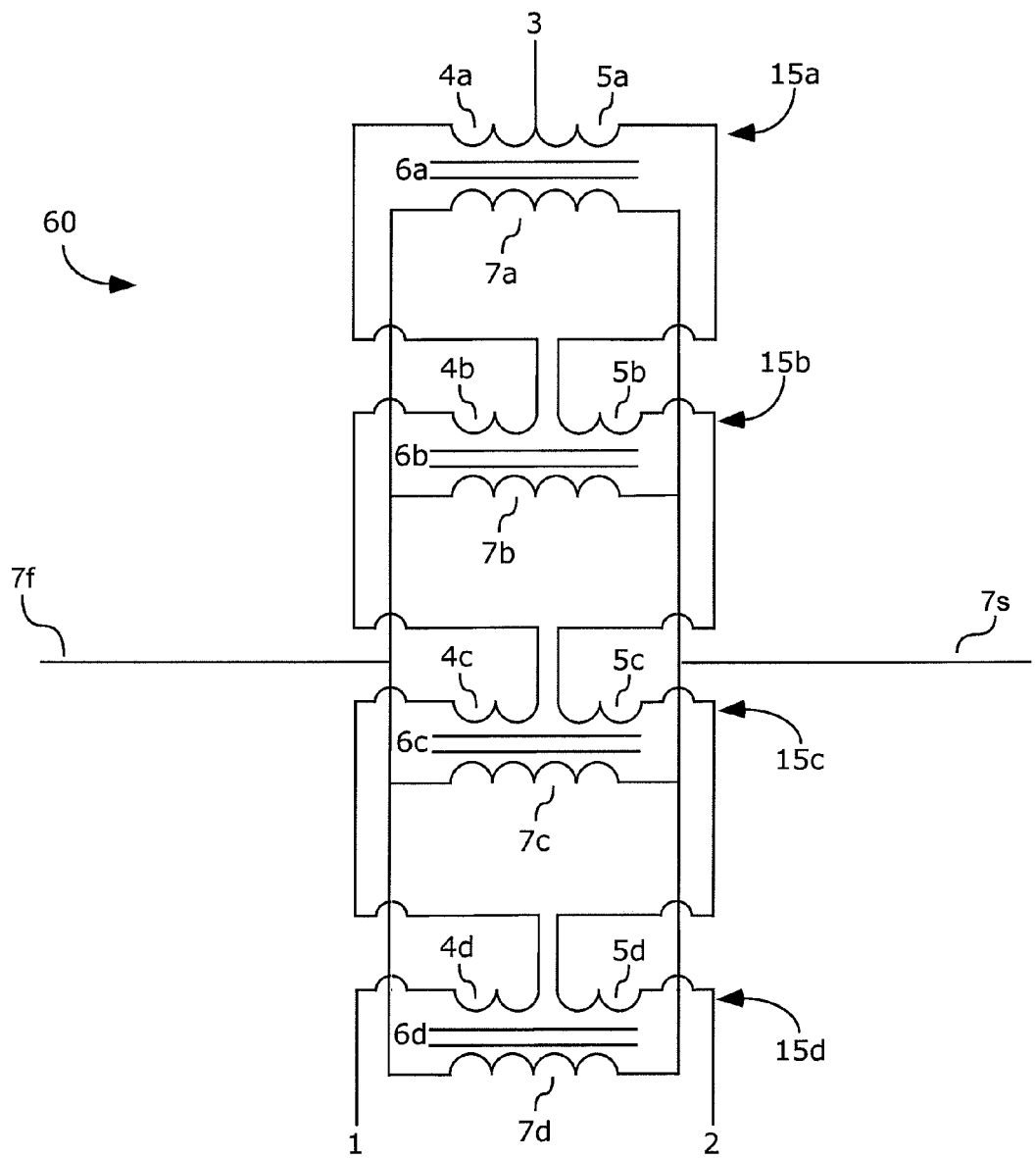
FIG. 6 is a schematic of secondary windings in parallel, primary windings, and transformer cores, of a transformer network, in accordance with an embodiment of the present invention.

FIGS. 2-5 show the first transformer core 6a plus two additional transformer cores 6b-6c. The total number of transformer cores 6 can be more than 2, more than 3, or more than 4. For example, circuit 60 of FIG. 6 shows four transformer cores 6a-6d, with primary windings 15a-15d, top primary windings sections 4a-4d, bottom primary windings sections 5a-5d, and secondary windings sections 7a-7d. The secondary windings sections 7a-7d are arranged in parallel in this figure.

What is claimed is:

1. A transformer network, comprising:
   a. an LC switching circuit including a center connection, a top connection, and a bottom connection;
   b. primary windings comprising top primary windings and bottom primary windings;
   c. the center connection electrically connected to a first end of the top primary windings and to a first end of the bottom primary windings, the top primary windings wrapped in a first direction around a first transformer core, the bottom primary windings wrapped in a second direction around the first transformer core, the first direction is opposite to the second direction;
   d. the top primary windings wrapped in the first direction around at least one additional transformer core then a second end of the top primary windings electrically connected to the top connection;
   e. the bottom primary windings wrapped in the second direction around the at least one additional transformer core then a second end of the bottom primary windings electrically connected to the bottom connection;
   f. secondary windings having a first end and a second end, the secondary windings wrapped around at least one of the first transformer core and the at least one additional transformer core; and
   g. the first end and the second end of the secondary windings configured to be electrically connected across a load.

2. The network of claim 1, wherein at least one of the first transformer core and the at least one additional transformer core is free of secondary windings.

3. The network of claim 1, wherein the LC switching circuit comprises:
   a. a direct current source electrically connected to a common connection at one end and to a first connection of an inductor at an opposing end;
   b. a second connection of the inductor electrically connected to the center connection;
   c. a capacitor having a first end electrically connected to the top connection, and at an opposing end, a second end electrically connected to the bottom connection;
   d. the capacitor electrically connected in parallel with the primary windings;
   e. a first electronic switch electrically connected to the common connection at one end and to the top connection at an opposing end; and
   f. a second electronic switch electrically connected to the common connection at one end and to the bottom connection at an opposing end.

4. The network of claim 1, wherein the secondary windings are wound on the first transformer core and a turn ratio of the primary windings to secondary windings on the first transformer core is greater than 1:10.

5. The network of claim 1, wherein the secondary windings are wound on at least one of the at least one additional transformer core and a turn ratio of the primary windings to secondary windings on at least one of the at least one additional transformer core is greater than 1:10.

6. The network of claim 1, wherein the secondary windings are wound on all of the at least one additional transformer core and a turn ratio of the primary windings to secondary windings on all of the at least one additional transformer core is greater than 1:10.

7. The network of claim 1, wherein a peak voltage of the secondary windings is at least 100 volts higher than a peak voltage of the primary windings.

8. The network of claim 1, further comprising the load and the secondary windings are electrically connected across the load.

9. The network of claim 8, wherein further comprising a high voltage multiplier circuit and wherein the load is a high voltage multiplier circuit.

10. The network of claim 9, wherein the high voltage multiplier circuit is configured to provide at least 1000 volts between an anode and a cathode of an x-ray tube.

11. The network of claim 10, further comprising the x-ray tube, the high voltage multiplier circuit is electrically connected to the cathode, and the anode is electrically connected to ground.

12. The network of claim 1, wherein the secondary windings are wrapped in series.

13. The network of claim 1, wherein the secondary windings are wrapped in parallel.

14. The network of claim 1, wherein the secondary windings are all wrapped in a single direction on all transformer cores.

15. The network of claim 1, wherein the at least one additional transformer core includes at least two additional transformer cores.

16. The network of claim 1, wherein the at least one additional transformer core includes at least three additional transformer cores.

17. A transformer network, comprising:
   a. an LC switching circuit including a center connection, a top connection, and a bottom connection, the LC switching circuit comprising:
      i. a direct current source electrically connected to a common connection at one end and to a first connection of an inductor at an opposing end;
      ii. a second connection of the inductor electrically connected to the center connection;
      iii. a capacitor having a first end electrically connected to the top connection, and at an opposing end, a second end electrically connected to the bottom connection;
      iv. the capacitor electrically connected in parallel with the primary windings;
      v. a first electronic switch electrically connected to the common connection at one end and to the top connection at an opposing end; and
      vi. a second electronic switch electrically connected to the common connection at one end and to the bottom connection at an opposing end;
   b. primary windings comprising top primary windings and bottom primary windings;
   c. the center connection electrically connected to a first end of the top primary windings and to a first end of the bottom primary windings, the top primary windings wrapped in a first direction around a first transformer core, the bottom primary windings wrapped in a second direction around the first transformer core, the first direction is opposite to the second direction;
   d. the top primary windings wrapped around at least two additional transformer cores then a second end of the top primary windings electrically connected to the top connection;
   e. the bottom primary windings wrapped around the at least two additional transformer cores then a second end of the bottom primary windings electrically connected to the bottom connection;

f. secondary windings having a first end and a second end, the secondary windings wrapped in a single direction around at least one of the first transformer core and the at least two additional transformer cores;
g. at least one of the first transformer core and the at least two additional transformer cores is free of secondary windings; and
h. the first end and the second end of the secondary windings configured to be electrically connected across a load.

18. A transformer network, comprising:
a. an LC switching circuit including a center connection, a top connection, and a bottom connection, the LC switching circuit comprising:
  i. a direct current source electrically connected to a common connection at one end and to a first connection of an inductor at an opposing end;
  ii. a second connection of the inductor electrically connected to the center connection;
  iii. a capacitor having a first end electrically connected to the top connection, and at an opposing end, a second end electrically connected to the bottom connection;
  iv. the capacitor electrically connected in parallel with the primary windings;
  v. a first electronic switch electrically connected to the common connection at one end and to the top connection at an opposing end; and
  vi. a second electronic switch electrically connected to the common connection at one end and to the bottom connection at an opposing end;
b. primary windings comprising top primary windings and bottom primary windings;
c. the center connection electrically connected to a first end of the top primary windings and to a first end of the bottom primary windings, the top primary windings wrapped in a first direction around a first transformer core, the bottom primary windings wrapped in a second direction around the first transformer core, the first direction is opposite to the second direction;
d. the top primary windings wrapped in the first direction around at least one additional transformer core then a second end of the top primary windings electrically connected to the top connection;
e. the bottom primary windings wrapped in the second direction around the at least one additional transformer core then a second end of the bottom primary windings electrically connected to the bottom connection;
f. secondary windings having a first end and a second end, the secondary windings wrapped in a single direction around at least one of the first transformer core and the at least one additional transformer core;
g. the first end and the second end of the secondary windings configured to be electrically connected across a load; and
h. a turn ratio of the primary windings to secondary windings on at least one of the first transformer core and the at least two additional transformer cores is greater than 1:10.

19. The network of claim 18, wherein the at least one additional transformer core includes at least three additional transformer cores.

20. The network of claim 18, further comprising the load and an x-ray tube and wherein the load is a high voltage multiplier circuit configured for providing at least 1000 volts between an anode and a cathode of the x-ray tube.

* * * * *